United States Patent [19]

Suzuki

[11] 4,319,618

[45] Mar. 16, 1982

[54] PNEUMATIC TIRE WHEEL FOR USE IN OFF-ROAD VEHICLES

[75] Inventor: Yasuo Suzuki, Akigawa, Japan

[73] Assignee: Bridgestone Tire Company, Limited, Tokyo, Japan

[21] Appl. No.: 144,106

[22] Filed: Apr. 28, 1980

[30] Foreign Application Priority Data

May 8, 1979 [JP] Japan .............................. 54/61030[U]

[51] Int. Cl.³ ...................... B60C 13/00; B60C 19/12
[52] U.S. Cl. .................................... 152/185; 152/196; 152/330 R; 152/353 R; 301/37 R; 301/37 P
[58] Field of Search ............... 152/154, 159, 173, 179, 152/182, 185, 187, 189, 190, 191, 196, 330 R, 352, 353, 379.4, 381.4, 406–408; 301/37 R, 37 ST, 37 P

[56] References Cited

U.S. PATENT DOCUMENTS

| 2,621,979 | 12/1952 | Barnes | 152/330 R |
| 2,963,326 | 12/1960 | Wood | 152/353 R |
| 3,825,052 | 7/1974 | Matsuyama et al. | 152/353 |
| 3,841,373 | 10/1974 | Gilreath | 152/209 B |
| 3,915,214 | 10/1975 | Pile et al. | 152/406 X |
| 4,030,530 | 6/1977 | Curtiss | 152/187 |

Primary Examiner—John E. Kittle
Attorney, Agent, or Firm—Sughrue, Mion, Zinn, Macpeak and Seas

[57] ABSTRACT

A pneumatic tire wheel for use in off-road vehicles is disclosed. This tire wheel is provided with a protrusion projecting over tread width and sectional width of the tire toward the widthwise direction thereof under an inflation pressure and being integrally united with each of side portions in the vicinity of the outer surface of the side portion above a definite position of the sectional width and near the tread portion, and a protector extending outward from the bead portion along the sidewall surface of at least one side portion up to the inside base of the protrusion toward the radial direction of the tire and composed of an annular disc provided at its inner periphery with an annular seat firmly sandwiched between the bead portion of the tire and the rim flange.

6 Claims, 5 Drawing Figures

FIG. 4
FIG. 5
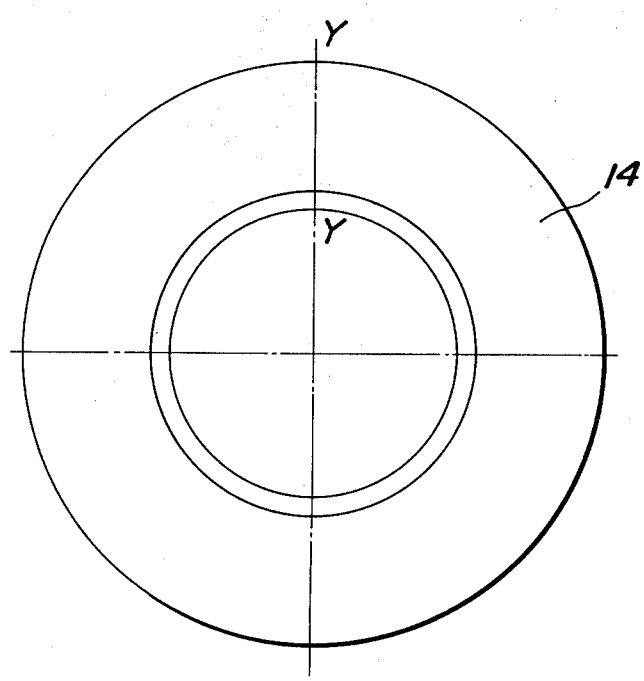
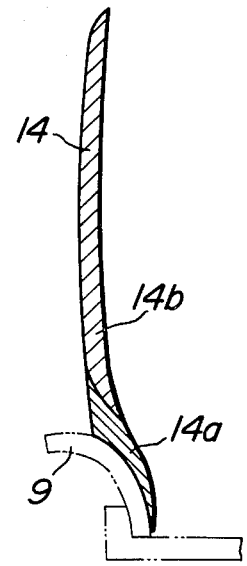

PNEUMATIC TIRE WHEEL FOR USE IN OFF-ROAD VEHICLES

This invention relates to pneumatic tire wheels for use in off-road vehicles and is to eliminate a fear of causing damage in a side portion of a pneumatic rubber tire due to the contact with stones and rocks, stubs or the like to thereby advantageously complete the useful life of the tire.

In the pneumatic tires for use in the off-road vehicle such as construction vehicle, cultivation vehicle or the like, there is a significant problem that when the tire strongly comes into contact with the tips of obstacles such as sharp rocks, broken stones, stubs after falling and the like scattered on a rough road, the surface portion of the tire is subjected to cut failure, resulting in the reduction of the useful life.

For this purpose, there have been various attempts such as the thickening of rubber gauge in the tread portion, which is most liable to cause cut failure, the combination of steel breaker with the carcass and the like. Particularly, it is recognized that the application of a steel belt to radial tires develops an excellent effect.

Such prevention of cut failure in the tread portion may relatively easily be attained, but cut failure in a region extending from a side edge of the tread or shoulder portion to a side portion can not be prevented by the above mentioned countermeasures. On the contrary, when the increase of rubber gauge, use of steel cord or the like is adapted to the side portion of the tire, performances required in the side portion, i.e. flexing property and comfortability accompanied therewith become degraded, so that such a countermeasure is unsuitable as opposed to the case of applying it to the tread portion.

That is, the thicker rubber gauge obstructs the flexing of the side portion to deteriorate the comfortability, and also cut damage once formed easily reaches the carcass owing to its growth, so that it is not very effective. While, the embedding of steel cords or the like results in separation and fatigue failures.

Heretofore, it has been proposed to cover the tire with a so-called net chain as a sole means for effectively preventing cut failure in the side portion. In this case, however, the tread portion is sometimes scraped off with the net chain and also vibration becomes violent during high-speed running aside from low-speed running, so that the use of the net chain is unsuitable in practice.

The invention provides pneumatic tired wheels which advantageously overcome the above mentioned drawbacks of the prior art and can effectively avoid cut failure in a region extending from a shoulder portion of a pneumatic rubber tire for use in off-road vehicle to a side portion thereof without degrading the usual running performances of the tire.

According to the invention, a protector for the prevention of side-cut failure is assembled into a rim along at least one side of the side portions together with the tire.

The tire to be considered in this specification includes pneumatic rubber tires of troidal form comprising a pair of bead portions, a pair of side portions and a tread portion. In these tires, the internal reinforcement may be a bias structure as usual, but the use of a breaker composed of steel cords is preferable for preventing the cut failure of the tread portion. Particularly, radial tires provided with a steel belt are advantageous in the prevention of such cut failure, but have a weak point in its side portion, so that the invention is more applicable to these radial tires as an effective protecting means for the side portion.

In any case, the pneumatic rubber tire to be used in the tire wheel according to the invention is provided with a protrusion projecting over tread width and sectional width of the tire toward the widthwise direction thereof under an inflation condition. This protrusion is integrally united with the side portion of the tire in such a manner that the maximum protruded part of the protrusion as well as the inside base of the protrusion crossing with the sidewall surface are outwardly located above the definite position of sectional width of tire in the radial direction of the tire or come near the tread portion of the tire.

The term "sectional width of tire" used herein means a maximum width of an outer contour of the tire in a tire section including the rotational axis of the tire or an equatorial section exclusive of decorations and other projections and parallel to the rotational axis of the tire. Therefore, it is obvious that the definite position of the sectional width corresponds to a point of the outer contour contacting with a line perpendicular to the rotational axis of the tire.

The protector to be used in the invention is composed of an annular disc provided at its inner periphery with an annular seat firmly sandwiched between the bead portion of the tire and a rim flange and extending along the sidewall surface up to the inside base of the protrusion.

In order to provide such spring action so that the outer periphery of the protector closely contacts with the inside base of the protrusion even in the deformation of the tire under ground contact, it is preferable that the protector has a radius of curvature larger than the maximum radius of curvature of the side portion anticipated under the deformation of the outer sidewall surface and usually forms a slight gap with the side portion at the definite position of the sectional width.

Since the protector rubs against the side portion of the tire, it is advantageous to prevent the abrasion of the tire. For this purpose, the protector is made from a material having a wear resistance slightly lower than that of the rubber skin of the side portion, that is, a rubber composition satisfying the above requirement, or a plastic material such as vinyl chloride resin, polyester resin and the like. In this case, the annular seat at the inner periphery of the protector is apt to cause wear due to the rubbing against the rim flange, so that the wear resistance of this seat may be locally increased by using a material having a slightly higher wear resistance or compounding short fibers made of nylon or the like into this seat portion. Moreover, the short fibers may be dispersed over the whole of the disc.

Furthermore, the inner surface of the protector may be covered with a coating of a water-repellent lubricant such as silicone oil or a good silicone Teflon coating, whereby the damaging of the side portion can effectively be prevented.

In the pneumatic tire for use in off-road vehicles, the side-cut failure in a region extending from the shoulder portion to the side portion is considered to result from the following two cases, one being due to the oblique riding on big stones or stubs and the other being due to the collision with falling stones from the rear body of the vehicle.

According to the invention, the side-cut resulting from the riding on stones and rocks scattered in the road is mainly prevented by the protrusion formed on the side portion of the tire, while the side-cut due to the collision of the side portion against falling stones from the rear body or obstacles projected from the road side is prevented by the protector.

The former side-cut is caused when the stones and rocks are trod by the tread portion of the tire near the shoulder portion thereof and slipped out from the shoulder portion to the side portion. In this connection, the protrusion according to the invention serves to spring out the stones and rocks from the running course of the tire. Furthermore, the protrusion is projected outward from the protector to cover the outer periphery of the protector, whereby there can be removed any fear that fragments of the rock lamp and ground stones will intrude into a space defined between the protector and the side portion to cause the side-cut of the side portion.

Therefore, the protrusion is necessary to have a protruding part passing over the tread width and sectional width on one hand, and is a lateral protrusion extending outward from the sidewall surface above the definite position of the sectional width through the maximum protruding part to the shoulder portion or through the maximum protruding part and sidewall surface to the shoulder portion toward the radial direction of the tire so as not to injure the flexing property required for the side portion of the tire on the other hand.

When the protruding part of the protrusion does not reach to the definite position of the sectional width under an inflation pressure, the intrusion of ground stones and the like can not be prevented. However, even when the side portion of the tire substantially pass the protruding part of the protrusion due to the deformation of the side portion at the ground contact area under a load, if the outer periphery of the protector is closely contacted with the inside base of the protrusion without separating off therefrom, there is caused no intrusion of ground stones and the like. Therefore, the outer periphery of the protector is necessary to extend over the definite position of the sectional width of the tire up to the inside base of the protrusion.

The invention will now be described in detail with reference to the accompanying drawings, wherein:

FIG. 4 is a front view of a protector to be used in the embodiment of FIG. 3; and FIG. 5 is an enlarged sectional view of the protector taken along the line Y—Y of FIG. 4.

Figure 1:
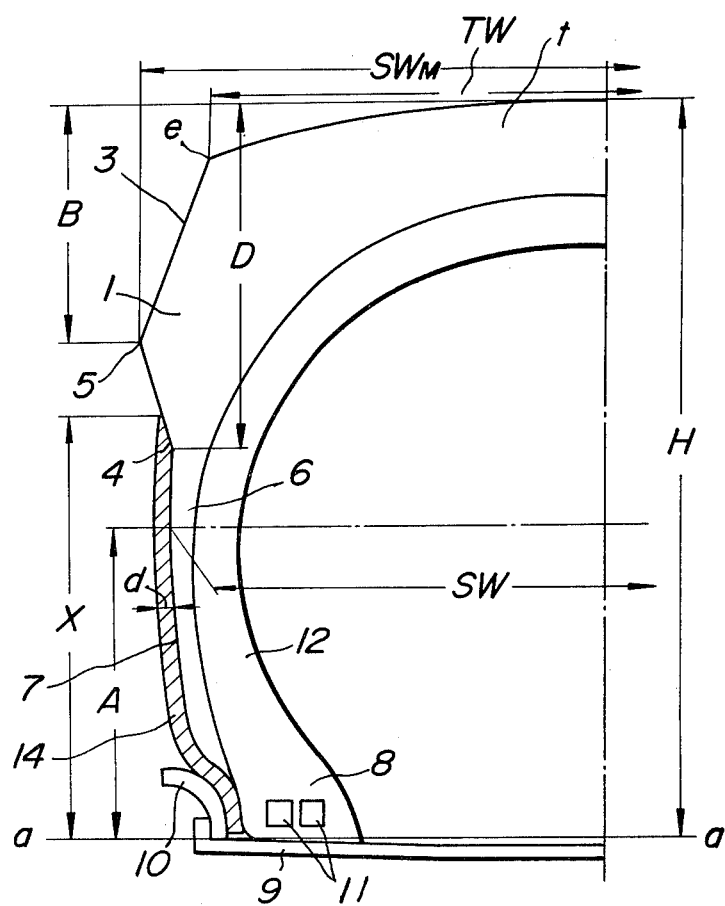
FIGS. 1-3 are schematic radial half sections of embodiments of the tire wheel for use in off-road vehicle according to the invention, respectively.
Figure 2:
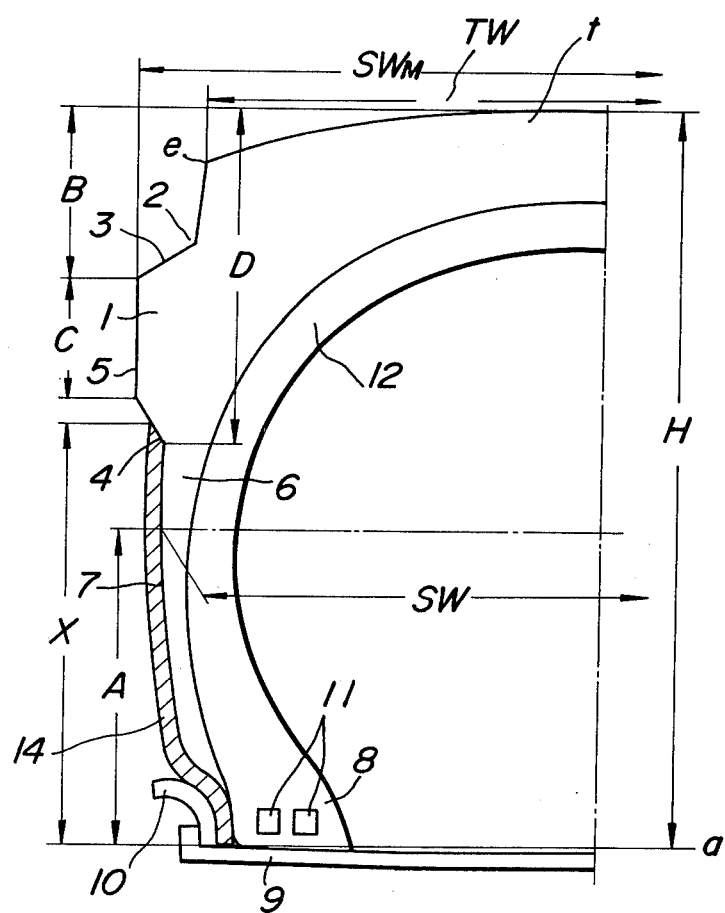
Figure 3:
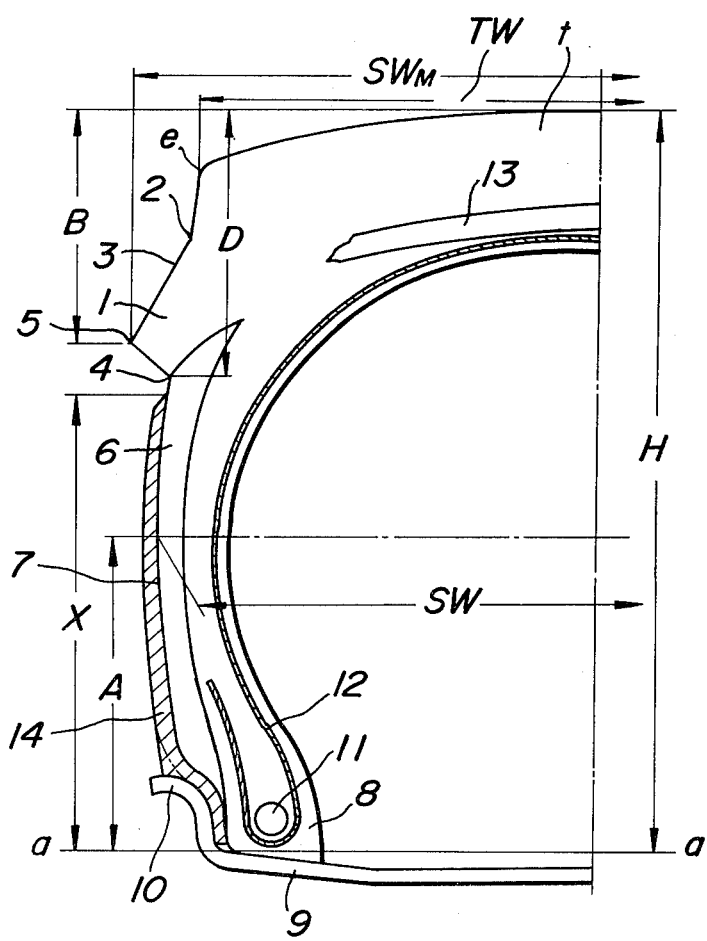

The form of the protrusion 1 may take various modifications as shown in FIGS. 1-3, each illustrating an outer contour of the tire shown in the equatorial section thereof. That is, the protrusion of FIG. 1 is a laterally projected mountain form starting from the shoulder portion of the tire or the side edge e of the tread portion t. The protrusion of FIG. 2 is a laterally projected trapezoidal form after stepping down inward from the side edge e toward the radial direction of the tire as shown by numeral 2. The protrusion of FIG. 3 is a laterally projected mountain form after the same stepping down as described above. In any case, a taper surface 3 of the protrusion serving to spring out ground stones crosses with an inside adjoining surface at an obtuse angle, and an inside base 4 of the above adjoining surface is located together with a maximum protruding part 5 of the protrusion near the tread portion above the definite position of the sectional width SW as previously mentioned, whereby the flexing property of the side portion is not obstructed by the protrusion 1. Particularly, it is desirable to satisfy the following relationship:

$$(H-A) \times 0.9 > D$$

wherein H is a maximum height of the tire measured from a bead base line a—a (a straight line passing the bead heel and parallel to the rotational axis of the tire), A is a height of the definite position of the sectional width measured from the bead base line a—a, and D is a distance from a tangent line of the tread parallel to the bead base line a—a up to the inside base 4.

In FIGS. 1-3, $SW_M$ is a width between the protrusions 1, TW is a tread width, B is a distance from the tangent line of the tread to the maximum protruded part 5, C is a length of the maximum protuded part in the equatorial section, 6 is a side portion, 7 is a sidewall surface, 8 is a bead portion, 9 is a rim, 10 is a rim flange, 11 is a bead core, 12 is a carcass, 13 is a breaker or belt, and 14 is a protector.

The protector 14 is composed of an annular disc as shown in FIGS. 4 and 5, whose inner diameter being substantially equal to the inner diameter of the bead portion 8 and a radial width X of which being reached to at least inside base of the protrusion. As shown in FIG. 5, it is possible to curve the protector with such an elasticity that the outer periphery of the protector closely contacts with the inside base. Preferably, the protector is a composite body composed of different materials wherein the wear resistance of an annular seat 14a at the inner periphery is higher than that of the remaining disc part 14b.

The combination of the tire form with the protector as mentioned above is applicable to pneumatic bias tires, but is particularly effective to pneumatic radial tires having a weakpoint in the sidewall thereof. Radial tires are often punctured due to the growth of cut damage owing to the large deformation of the side portion.

In FIG. 1 is shown an embodiment of tires for construction vehicles having a size of 16.00-25 24PR, wherein the carcass 12 is composed of 24 plies alternately crossed with each other at a certain angle with respect to the circumferential direction of the tire, each ply being composed of nylon cords embedded in rubber. In this embodiment, there is used a rim of 11.25×25 TB(OR).

In the tire of FIG. 1, the tire height H is 413 mm, the height of the definite position of the sectional width A is 190 mm and the sectional width SW is 432 mm. Further, the protrusion 1 is integrally united with the sidewall surface in the mountain form so that the distance B between the tangent line of the tread and the maximum protruding part 5 of the protrusion is 120 mm, the width $SW_M$ between the maximum protruded parts of the protrusions is 460 mm and the distance D between the tangent line of the tread and the inside base 4 is 180 mm. On the other hand, the side protector 14 covers the side portion 6 along the sidewall surface at a width X of 250 mm extending from the bead base line a—a toward the tread in the rim assembled state and its outer periphery overlaps with the inside base of the protrusion. The protector 14 has a maximum gauge d of 8 mm at its central portion and the annular seat 14a at the inner periphery thereof is firmly sandwiched between the flange 10 of the rim 9 and the bead portion 8 of the tire.

In this embodiment, the rubber skin at the sidewall surface of the tire is composed of 80 parts of NR, 20 parts of SBR and 43 parts of ISAF, while the rubber for the protector 14 is composed of 100 parts of NR and 30 parts of HAF, so that the wear resistance of the protector is smaller than that of the side portion.

FIG. 2 shows a modified embodiment of the tire shown in FIG. 1, wherein the form of the protrusion 1 is different from that of FIG. 1. That is, the protrusion 1 has a maximum protruded part of a plane perpendicular to the rotational axis of the tire and projecting widthwisely from a position stepped down inside the side edge e of the tread portion t and smoothly connecting to the sidewall surface, and is $B=90$ mm, $C=60$ mm, $D=180$ mm, $SW_M=460$ mm, $SW=432$ mm and $H=413$ mm.

In the tire of FIG. 2, the protrusion projects laterally from the position stepped down inside the side edge of the tread t, so that heat generation becomes small in a region extending from the shoulder to buttress portion and consequently the occurrence of separation between the carcass and the tread reduces. Further, the effect of springing out stones and rocks by the maximum flat protruded part 5 is doubled in regard to the side-cut failure.

In FIG. 3 is shown an embodiment of radial tires having the same size of 16.00R-25 24PR as in FIGS. 1 and 2, wherein the carcass 12 is composed of one rubberized steel cord ply layer extending across the two bead cores in radial direction and a belt 13 composed of three layers containing steel cords embedded therein, each cord being inclined at a small angle with respect to the circumferential direction, is placed between the tread portion t and the carcass 12.

This tire has dimensions of $H=424$ mm, $B=122$ mm, $D=147$ mm, $A=195$ mm, $SW_M=470$ mm and $SW=440$ mm.

The protector 14 is secured by firmly sandwiching the annular seat 14a between the bead portion 8 of the tire and the flange 10 of the rim 9. The radial width X of the protector 14 is 265 mm.

The protector 14 used in the embodiment of FIG. 3 is shown as a front view in FIG. 4 and as an enlarged sectional view taken along the line Y—Y in FIG. 5, respectively. This protector is shaped so that the annular seat 14a is thinned inward to meet the shape of the flange and is different in the rubber material from the remaining disc part 14b for the purpose of preventing the occurrence of wear due to the rubbing against the flange 10 of the rim 9.

In the radial tire of FIG. 3, the rubber skin at the sidewall surface 7 is composed of 60 parts of NR, 40 parts of SBR and 45 parts of HAF, while the protector 14 consists of the disc part 14b composed of 50 parts of NR, 50 parts of SBR and 30 parts of HAF, and the annular seat 14a composed of 50 parts of NR, 50 parts of BR and 70 parts of HAF. Therefore, the wear resistance is reduced in the order of the annular seat 14a, the outer skin of the sidewall surface 7 and the disc part 14b. Moreover, silicone oil is applied to an inner surface of the protector 14 for lubrication against the sidewall surface 7 because the deformation of the side portion 6 is particularly large in the radial tire.

If the deformation of the side portion 6 is conspicuous between the outer periphery of the protector 14 and the protrusion 1, a slight gap may open. In this case, however, the outer periphery of the protector is sufficient to be behind the protrusion.

According to the invention, the side-cut failure can completely be prevented by providing a protrusion in the vicinity of the outer surface of the side portion near the shoulder of the tire and potecting the region extending inward from the protrusion to the bead portion with a protector. Such a preventing effect can not be obtained by either the protrusion or the protector, or is reduced to half when the protecting region of the protector separates apart from or overlaps with the protrusion.

That is, the protrusion prevents the occurrence of side-cut due to stones and rocks scattered on road surface, while the protector prevents the occurrence of cut failure due to falling stones and rocks from the rear body or the like. Therefore, when only the large protrusion is provided on the tire, the cut failure due to falling stones and rocks from the rear body can not be prevented, while only when the protector is provided on the tire, the intrusion of stones between the protector and the sidewall surface can not be prevented. On the other hand, when the gap between the protector and the protrusion is too broad, the cut failure is apt to cause in this gap portion, while when the protector overlaps with the protrusion, it separates off from the side portion and consequently stones and the like intrude into the space defined between the side portion and the protector to cause the side-cut.

The tire wheel according to the invention does not substantially exert an influence on the spring action or flexure of the tire as compared with the tire having no protector, so that the comfortability is not injured.

As a result of testing each tire wheel of the above embodiments as a tire for dump truck under substantially the same road conditions as in a dam spot, side-cut failure is reduced to 1/10 as compared with the conventional tires having no protrusion and protector, and to ¼ as compared with the tires having only the protrusion.

What is claimed is:

1. A pneumatic tire wheel for use in off-road vehicles with a tire comprising a pair of bead portions, a pair of side portions and a tread portion is assembled into a rim together with a protector extending outward from the bead portion along the sidewall surface of at least one side portion toward the radial direction of the tire, the improvement comprising; a carcass of radial construction, a protrusion projecting over tread width and sectional width of the tire toward the widthwise direction thereof under an inflation pressure integrally united with each of the side portions in the vicinity of the outer surface of the side portion above a definite position of the sectional width and near the tread portion to locate an inside base of the protrusion crossing with the sidewall surface and a maximum protruding part thereof above the definite position of the sectional width; the protector comprises an annular disc provided at its inner periphery with an annular seat firmly sandwiched between the bead portion of the tire and a flange of the rim and extending along the sidewall surface up to the inside base of the protrusion and made from rubber or rubbery material; and the annular seat of the protector and rubber skin at the sidewall surface of the side portion has a wear resistance higher than that of the remaining disc part of the protector, wherein the wear resistance is reduced in the order of the annular seat of the protector, the rubber skin at the sidewall surface of the side portion and the disc part of the protector.

2. A pneumatic tire wheel as claimed in claim 1, wherein the protector made from the rubber or rubbery material contains nylon short fibers dispersed therein.

3. A pneumatic tire wheel as claimed in claim 1, wherein the protector is covered at its surface facing to the sidewall surface with a coating of silicone oil.

4. A pneumatic tire wheel as claimed in claim 1, wherein the protector is covered at its surface facing to the sidewall surface with a Teflon coating.

5. A pneumatic tire wheel as claimed in claim 1, wherein the protector has a radius of curvature larger than the maximum radius of curvature of the side portion anticipated under the deformation of the outer sidewall surface and may form a slight gap with the side portion at the definite position of the sectional width.

6. A pneumatic tire wheel as claimed in claim 1, wherein the protrusion has a maximum protruded part of a plane perpendicular to the rotational axis of the tire and projecting widthwisely from a position stepped down inside the side edge of the tread portion.

* * * * *